US008539932B2

(12) United States Patent
Ramappan et al.

(10) Patent No.: US 8,539,932 B2
(45) Date of Patent: Sep. 24, 2013

(54) SYSTEMS AND METHODS FOR HEATING INTAKE AIR DURING COLD HCCI OPERATION

(75) Inventors: Vijay Ramappan, Novi, MI (US); Jonathan T. Shibata, Whitmore Lake, MI (US); Amanpal S. Grewal, Novi, MI (US)

(73) Assignee: GM Global Technology Operations LLC

( * ) Notice: Subject to any disclaimer, the term of this patent is extended or adjusted under 35 U.S.C. 154(b) by 769 days.

(21) Appl. No.: 12/629,966

(22) Filed: Dec. 3, 2009

(65) Prior Publication Data
US 2011/0132317 A1   Jun. 9, 2011

(51) Int. Cl.
*F02B 17/00*  (2006.01)
*F02D 41/06*  (2006.01)
*F02D 43/00*  (2006.01)
*F02M 7/00*   (2006.01)
*F02G 5/00*   (2006.01)

(52) U.S. Cl.
USPC ..................... 123/295; 123/179.18

(58) Field of Classification Search
USPC ............... 123/179.15, 179.18, 295, 556, 336, 123/362, 349; 701/113
See application file for complete search history.

(56) References Cited

U.S. PATENT DOCUMENTS

| 7,213,566 | B1 * | 5/2007 | Jankovic | 123/302 |
| 7,258,104 | B2 * | 8/2007 | Young et al. | 123/432 |
| 7,448,359 | B2 * | 11/2008 | Jankovic | 123/432 |
| 2005/0183693 | A1 * | 8/2005 | Yang et al. | 123/305 |
| 2006/0150952 | A1 * | 7/2006 | Yang et al. | 123/432 |
| 2008/0066459 | A1 * | 3/2008 | O'Neill | 60/324 |
| 2008/0066715 | A1 * | 3/2008 | Jankovic | 123/302 |
| 2009/0235903 | A1 * | 9/2009 | Yang et al. | 123/543 |
| 2009/0281713 | A1 * | 11/2009 | Jankovic et al. | 701/111 |

* cited by examiner

*Primary Examiner* — Stephen K Cronin
*Assistant Examiner* — Arnold Castro

(57) ABSTRACT

A system for controlling intake airflow of an engine includes a mode determination module, a throttle valve control module, and a valve actuation module. The mode determination module generates a mode signal based on an engine speed signal and an engine load signal. The mode signal indicates one of a spark ignition mode and a homogeneous charge compression ignition mode. The throttle valve control module generates a valve control signal based on the mode signal, a temperature signal, and a plurality of valve position signals that indicate positions of first and second throttle valves. The throttle valve control module controls the positions of the first and second throttle valves to regulate flow rates of intake air into an intake manifold of the engine via a heat exchanger based on the valve control signal. The valve actuation module actuates the first and second throttle valves based on the valve control signal.

20 Claims, 3 Drawing Sheets

SYSTEMS AND METHODS FOR HEATING INTAKE AIR DURING COLD HCCI OPERATION

FIELD

The present disclosure relates to engine control systems, and more particularly to engine control systems for engines operating in spark ignition and homogenous charge compression ignition modes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) may be operated in a spark ignition (SI) mode and a homogeneous charge compression ignition (HCCI) mode for fuel efficiency and increased engine power. In the SI mode, an air/fuel mixture may be ignited by spark plugs in cylinders of the ICE. In the HCCI mode, an air/fuel mixture may be ignited through compression without ignition by spark plugs. The HCCI mode is more efficient than the SI mode because the HCCI mode enables the ICE to operate with leaner air/fuel mixtures than when in the SI mode.

The HCCI mode generates a flameless release of energy with a lean air/fuel mixture by compressing the air/fuel mixture to a point of auto-ignition. The HCCI mode can provide improved fuel economy and generate lower emission levels than the SI mode. However, since there is no direct initiator of combustion, the ignition process may be inherently challenging to control.

For example, combustion during the HCCI mode may be controlled based on temperature. The temperature may be based on an engine coolant temperature (ECT) signal from an ECT sensor. During a cold start of the ICE, the HCCI mode may be disabled until the ECT signal is greater than or equal to a predetermined temperature. Enabling the HCCI mode during the cold start may cause an unstable and degraded auto ignition.

During the HCCI mode, if the air/fuel mixture is ignited by compression before the predetermined temperature is reached, noise, damage to engine components, misfires, and/or an engine stall may occur. This increases emissions and reduces drivability of the ICE. For the above reasons, the HCCI mode may be delayed until the ICE is heated to the predetermined temperature.

SUMMARY

In one embodiment, a system is provided that includes a mode determination module, a throttle valve control module, and a valve actuation module. The mode determination module generates a mode signal based on an engine speed signal and an engine load signal. The mode signal indicates one of a spark ignition (SI) mode and a homogeneous charge compression ignition (HCCI) mode. The throttle valve control module generates a valve control signal based on the mode signal, a temperature signal, and a plurality of valve position signals that indicate positions of a first throttle valve and a second throttle valve. The throttle valve control module controls positions of the first throttle valve to regulate a first flow rate of intake air out of the first throttle valve and into an intake manifold of the engine based on the valve control signal. The throttle valve control module controls positions of the second throttle valve to regulate a second flow rate of the intake air through a heat exchanger and into the intake manifold based on the valve control signal. The valve actuation module actuates the first throttle valve and the second throttle valve based on the valve control signal.

In other features, a method of controlling intake airflow of an engine is provided. The method includes generating a mode signal based on an engine speed signal and an engine load signal. The mode signal indicates one of a SI mode and a HCCI mode via the mode signal. A valve control signal is generated based on the mode signal, a temperature signal, and a plurality of valve position signals that indicate positions of a first throttle valve and a second throttle valve. Positions of the first throttle valve are controlled to regulate a first flow rate of intake air out of the first throttle valve and into an intake manifold of the engine based on the valve control signal. Positions of the second throttle valve are controlled to regulate a second flow rate of the intake air through a heat exchanger and into the intake manifold based on the valve control signal. The first throttle valve and the second throttle valve are actuated based on the valve control signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
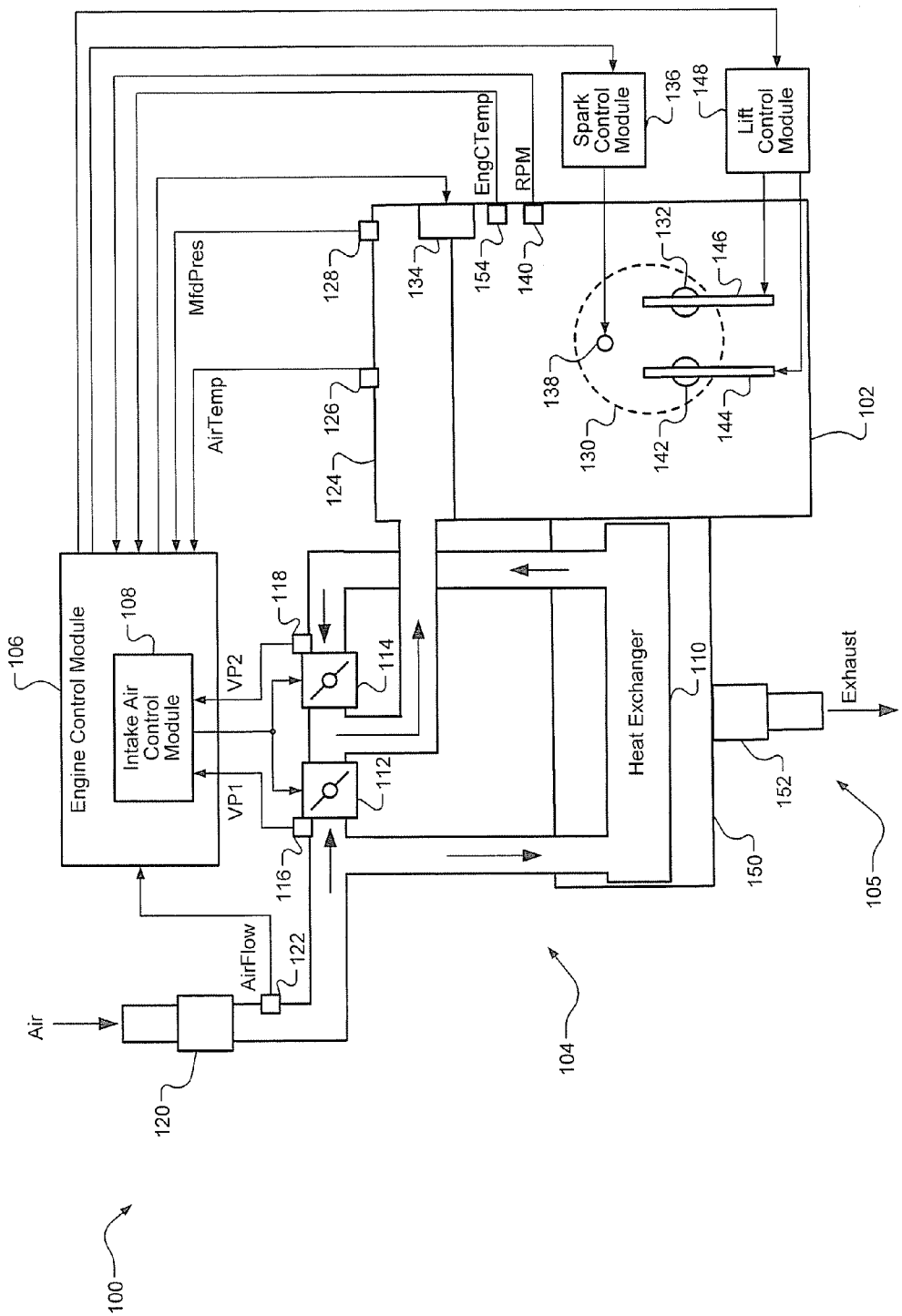
FIG. 1 is a functional block diagram of an exemplary engine control system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control system according to the present disclosure may operate an ICE in a SI mode and a HCCI mode. The HCCI mode may reduce fuel consumption because the HCCI mode may initiate ignition through compression with a leaner air/fuel mixture than when in the SI mode. Conditions for enabling the HCCI mode may be satisfied based on a relationship between an engine speed signal and an engine load signal. For example only, a first condition may be satisfied when the engine speed signal is within a first predetermined range. As another example, a second condition may be satisfied when the engine load signal is within a second predetermined range. The engine control system may operate the ICE in the SI mode when the HCCI mode is disabled.

The ICE may be a direct injection gasoline engine and may be selectively operated in a stratified operating mode. To operate in the stratified operating mode, fuel injectors inject fuel into a selected area of a combustion chamber before and close in time to an ignition event. A remainder of the combustion chamber may be filled with a leaner air/fuel mixture than the air/fuel mixture in the selected area. This provides a stoichiometric charge near a spark plug, which causes an air/fuel mixture to ignite easily and burn quickly and smoothly. The stratified operating mode may provide a leaner air/fuel mixture than when in a homogeneous operating mode. Consequently, the stratified operating mode may minimize engine emissions and fuel consumption losses.

The embodiments of the present disclosure provide techniques for controlling intake air temperature and airflow rate during cold start and/or warm-up events of an engine. The techniques may reduce pumping losses and provide a lean air/fuel mixture during the HCCI mode. A lean air/fuel mixture may be provided by adjusting an intake airflow rate and a fueling rate. The intake airflow rate and the fueling rate may be controlled by, for example, engine throttle control valves and a fuel injection system.

The techniques may also reduce an amount of time associated with enabling the HCCI mode during the cold start event of the engine. A use of heated intake air enables a transition from the SI mode to the HCCI mode sooner than a non-use of the heated intake air. The earlier the HCCI mode is enabled, the better the fuel efficiency of the engine.

In FIG. 1, an exemplary engine control system 100 of a vehicle is shown. The engine control system 100 may include an engine 102, a dual intake air system 104, and an exhaust system 105. The dual intake air system 104 enables the engine 102 to be operated in the HCCI mode early on in a cold start event of the engine 102 by preheating intake air before being received by the engine 102. Thermal energy is transferred from an exhaust system 105 of the engine 102 to the intake air using a heated air intake path. An example of the heated air intake path is described in FIG. 2.

The dual intake air system 104 includes an engine control module (ECM) 106 with an intake air control module 108, a heat exchanger 110, a first throttle valve (cold throttle valve) 112, and a second throttle valve (hot throttle valve) 114. The intake air control module 108 controls intake airflow by actuating the throttle valves 112, 114 based on engine temperature, engine load, and engine speed. The engine temperature may refer to engine oil temperature, engine coolant temperature, intake air temperature, and/or combustion chamber temperature.

The first throttle valve 112 may be equipped with a throttle position sensor (TPS) 116. The TPS 116 may generate a first valve position signal VP1 for the first throttle valve 112. The second throttle valve 114 may also be equipped with a separate TPS 118. The TPS 118 may generate a second valve position signal VP2 for the second throttle valve 114. The intake air control module 108 may monitor the position of the throttle valves 112, 114 using one or more of the TPSs 116, 118. The intake air may be drawn into the engine 102 to provide an engine operating condition that is conducive to HCCI mode enablement during cold start and/or warm-up events of the engine 102. The engine operating condition may refer to when the engine temperature is greater than or equal to a predetermined temperature (e.g., 90-95° C.).

The dual intake air system 104 may include a mass airflow (MAF) sensor 122, an intake air temperature (IAT) sensor 126, and a manifold absolute pressure (MAP) sensor 128. During engine operation, the intake air passes through an air filter 120 and by the MAF sensor 122. The MAF sensor 122 generates a MAF signal AirFlow that indicates a rate of airflow through the MAF sensor 122. The intake air is drawn into an intake manifold 124 based on positions of the throttle valves 112, 114.

The IAT sensor 126 may detect temperature of the intake air that is drawn into the intake manifold 124. The IAT sensor 126 may generate an IAT signal AirTemp. The IAT sensor 126 may be located in the intake manifold 124 and generate the IAT signal AirTemp based on an intake air temperature. The MAP sensor 128 may detect an air pressure within the intake manifold 124 and generate a MAP signal MfdPres. The MAP sensor 128 may be positioned in the intake manifold 124. The MAP signal MfdPres indicates the air pressure in the intake manifold 124.

The intake air from the intake manifold 124 is drawn into cylinders of the engine 102 through an intake valve 132. Although the engine 102 is shown as having a single representative cylinder 130, the engine 102 may include any number of cylinders. The ECM 106 may control an amount of fuel injected by a fuel injection system 134. The fuel injection system 134 may inject fuel into the intake manifold 124 at a central location or may inject fuel into the intake manifold 124 at multiple locations, such as near the intake valve 132 of each of the cylinders of the engine 102. Alternatively, the fuel injection system 134 may inject fuel directly into the cylinders of the engine 102. Injected fuel mixes with received air and creates an air/fuel mixture in the cylinder 130.

The ECM 106 may include an engine speed sensor 140, a spark control module 136, and a lift control module 148. The engine speed sensor 140 may generate an engine speed signal RPM that indicates a speed of the engine 102. The speed may refer to a rotational speed of a crankshaft in revolutions per minute (RPM). The rotational speed is generated via combustion of the air/fuel mixture in the cylinder 130. A piston (not shown) within the cylinder 130 compresses the air/fuel mixture. The spark control module 136 may energize a spark plug 138 in the cylinder 130 to ignite the air/fuel mixture. The timing of the ignition may be based on a time when the piston is at its topmost position, referred to as top dead center (TDC).

The piston expels exhaust gas through an exhaust valve 142. The exhaust valve 142 may be controlled by an exhaust camshaft 144, while the intake valve 132 may be controlled by an intake camshaft 146. In various implementations, multiple intake camshafts may control multiple intake valves per cylinder and/or may control intake valves of multiple banks of cylinders. Similarly, multiple exhaust camshafts may control multiple exhaust valves per cylinder and/or may control exhaust valves for multiple banks of cylinders. The lift control module 148 may command switching of the intake and exhaust valves 132, 142 between a high and low lift states. For example, the lift control module 148 may transition between two discrete valve states (e.g., the low-lift state and the high-lift state) on the intake and/or exhaust valves 132, 142.

The exhaust gas is discharged out of the engine 102 via an exhaust manifold 150. The exhaust manifold 150 may include a catalytic converter 152 to remove particulate matter from the exhaust gas. The exhaust manifold 150 may provide a source of heat for the heat exchanger 110. For example, the heat exchanger 110 may be positioned over the exhaust manifold 150 so that heat from the exhaust manifold 150 may be transferred to the heat exchanger 110.

The dual intake air system 104 may also include an engine coolant temperature (ECT) sensor 154 to detect the engine temperature. The ECT signal EngCTemp may be generated by the ECT sensor 154. The ECT sensor 154 may be located within the engine 102 or at other locations where the coolant is circulated, such as a radiator (not shown).

Figure 2:
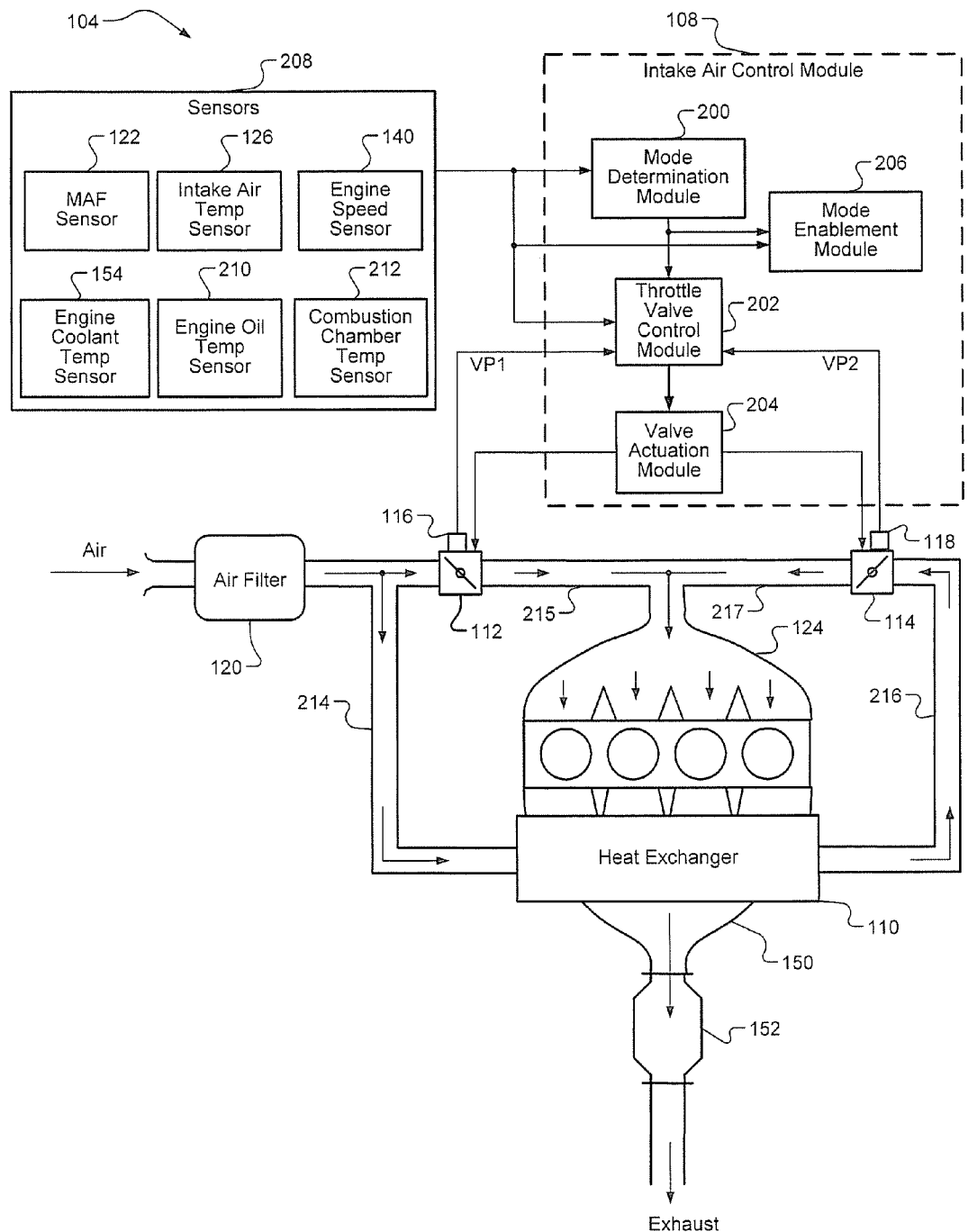
FIG. 2 is a functional block diagram of a dual intake air system in accordance with an embodiment of the present disclosure.

In FIG. 2, an exemplary dual intake air system 104 of the engine control system 100 is shown. The dual intake air system 104 may include the intake air control module 108, the heat exchanger 110, the first throttle valve 112, and the second throttle valve 114. The intake air control module 108 may include a mode determination module 200, a throttle valve control module 202, a valve actuation module 204, and a mode enablement module 206.

The mode determination module 200 may receive signals from sensors 208. The sensors 208 may include the MAF sensor 122, the IAT sensor 126, the engine speed sensor 140, the ECT sensor 154, an engine oil temperature sensor 210, and a combustion chamber temperature sensor 212. The engine oil temperature sensor 210 may generate an engine oil temperature signal OilTemp that indicates a temperature of the engine oil. The combustion chamber temperature sensor 212 may generate a combustion chamber temperature signal CCTemp that indicates a temperature of a combustion chamber.

The mode determination module 200 receives the engine speed signal RPM from the engine speed sensor 140 and the MAF signal AirFlow from the MAF sensor 122. The mode determination module 200 generates a mode signal that indicates one of the SI and HCCI modes based on the engine speed signal RPM and an engine load signal LOAD. The engine load signal LOAD may be generated based on the MAF signal AirFlow.

The throttle valve control module 202 receives the mode signal and generates a valve control signal based on the mode signal, a temperature signal, and the first and second valve position signals VP1, VP2. The temperature signal may be determined based on at least one of the engine coolant temperature signal EngCTemp, the intake air temperature signal AirTemp, the engine oil temperature signal OilTemp, and the combustion chamber temperature signal CCTemp. Additionally, the temperature signal may be modeled based on other engine parameters, such as an engine load, an engine torque, and an engine speed.

The valve actuation module 204 actuates the throttle valves 112, 114 based on the valve control signal. Positions of the throttle valves 112, 114 are adjusted to provide intake air temperature for enablement of the HCCI mode. For example, the first throttle valve 112 may be closed to force intake air to pass through a first air conduit 214. The intake air may be heated by the heat exchanger 110. The second throttle valve 114 may be opened to direct the intake air into the intake manifold 124 via a second air conduit 216. The first and second throttle valves 112, 114 may be regulated such that the intake air temperature entering the intake manifold 124 is set to predetermined temperature for the enablement of the HCCI mode.

The mode enablement module 206 receives the mode signal and the temperature signal and enables the HCCI mode based on the mode signal and the temperature signal. For example, the engine 102 may be operated in the HCCI mode when the mode signal indicates the HCCI mode and when the temperature signal is greater than or equal to a predetermined temperature.

Figure 3:
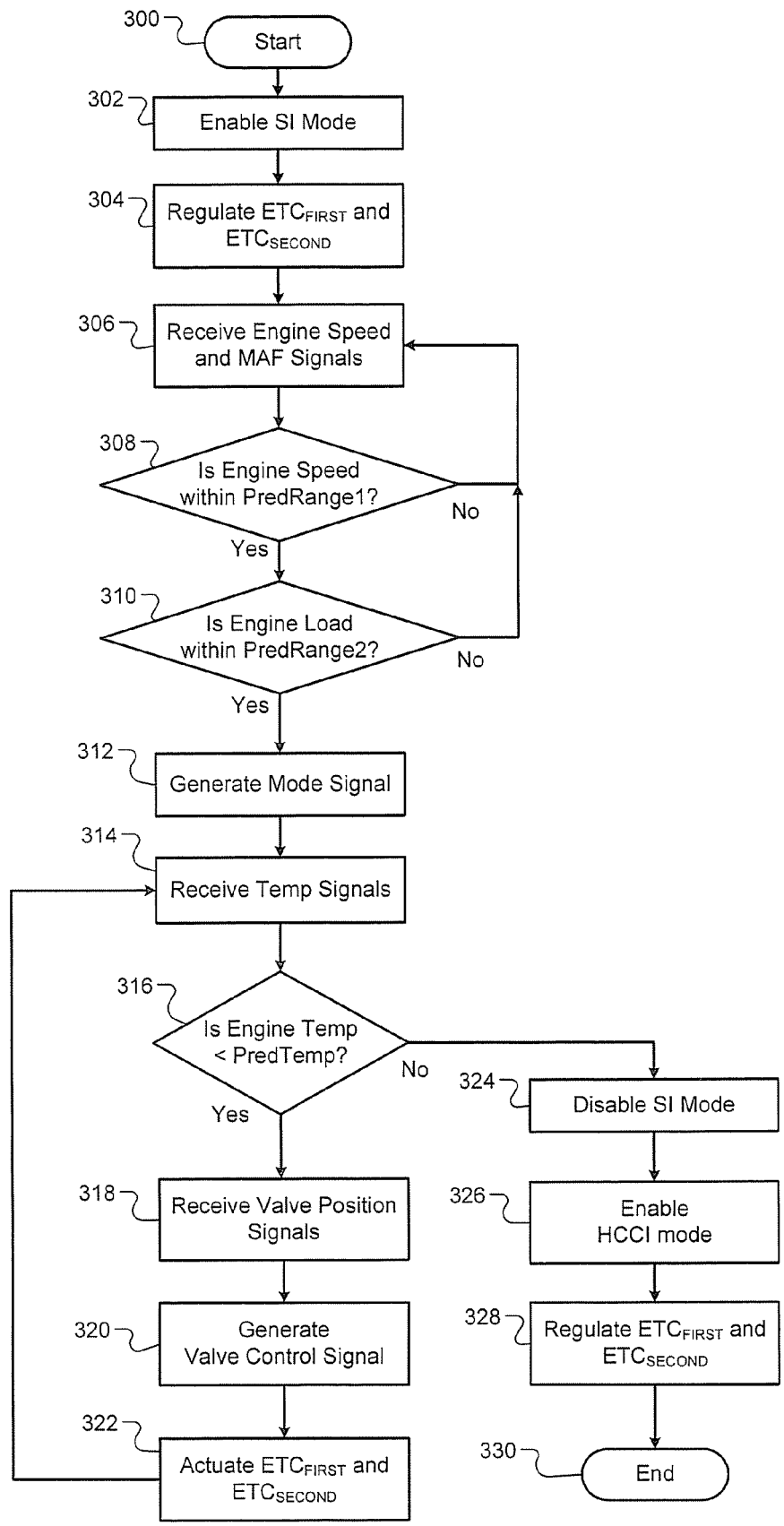
FIG. 3 illustrates a method of controlling intake airflow of an engine in accordance with an embodiment of the present disclosure.

In FIG. 3, a method of controlling intake airflow of an engine for enablement of the HCCI mode is shown. Although the following steps are primarily described with respect to the embodiments of FIGS. 1-2, the steps may be modified to apply to other embodiments of the present disclosure. Control of a control module such as the intake air control module 108 of FIG. 1 may perform the following steps.

The method may begin at step 300. In step 302, the mode enablement module 206 may initially enable the SI mode, which may be a default mode for the engine 102. In step 304, the valve actuation module 204 may initially regulate the first throttle valve 112 to a partially open position and the second throttle valve 114 to a partially closed position. This allows the intake air to be drawn into the intake manifold 124 through both a first intake air path 215 and a second intake air path 217 to provide predetermined temperature and airflow rate for enablement of the HCCI mode.

In step 306, the mode determination module 200 receives the engine speed signal RPM from the engine speed sensor 140 and the MAF signal AirFlow from the MAF sensor 122. The engine load signal LOAD may be generated based on the MAF signal AirFlow.

In step 308, control may proceed to step 310 when the engine speed signal RPM is within a first predetermined range, otherwise control may return to step 306. In step 310, control may proceed to step 312 when the engine load signal LOAD is within a second predetermined range, otherwise control may return to step 306. The mode determination module 200 determines whether the engine 102 is capable of enabling the HCCI mode based on the engine speed signal RPM and the engine load signal LOAD.

In step 312, the mode determination module 200 generates a mode signal that indicates one of the SI and HCCI modes based on the engine speed signal RPM and the engine load signal LOAD. The HCCI mode is enabled when the mode signal indicates the HCCI mode and when an engine temperature is greater than a predetermined temperature. In other words, although the mode signal indicates the HCCI mode, an enablement of the HCCI mode is delayed until a temperature signal of the engine 102 is greater than or equal to a predetermined temperature. Therefore, the engine 102 may be operated in the SI mode until the HCCI mode is enabled based on the temperature signal.

In step 314, the throttle valve control module 202 may receive the temperature signal. The temperature signal may be determined based on at least one of the engine coolant temperature signal EngCTemp, the intake air temperature signal AirTemp, the engine oil temperature signal OilTemp, and the combustion chamber temperature signal CCTemp. For example only, the temperature signal TEMP may be defined as provided in expression 1.

$$\text{TEMP} = F\{\text{EngCTemp}, \text{AirTemp}, \text{OilTemp}, \text{CCTemp}\} \quad (1)$$

EngCTemp is an engine coolant temperature. AirTemp is an intake air temperature. OilTemp is an engine oil temperature. CCTemp is a combustion chamber temperature.

In step 316, control may proceed to step 318 when the temperature signal is less than the predetermined temperature, otherwise control may proceed to step 324. For example, if the temperature signal is greater than or equal to the predetermined temperature and the mode signal indicates the HCCI mode, the HCCI mode may be enabled for the engine 102 without delay. Enablement of the HCCI mode may be delayed while the temperature signal is less than the predetermined temperature.

In step 318, the throttle valve control module 202 receives the first and second valve position signals VP1, VP2. The valve position signals VP1, VP2 may be received from the TPSs 116, 118 for the throttle valves 112, 114 respectively. The valve position signals VP1, VP2 correspond to positions of the throttle valves 112, 114.

In step 320, the throttle valve control module 202 may generate a valve control signal based on the mode signal, the temperature signal, and the throttle valve position signals. The throttle valve control module 202 controls the amount of the intake air that is drawn into the intake manifold 124 and the amount of the intake air that is directed to the heat exchanger 110.

For example, a portion or all of the intake air may be directed through the heat exchanger 110 based on positions of the first and second throttle valves 112, 114. The intake air may be directed to the intake manifold 124 through the intake air paths 215, 217. The throttle valve control module 202 may regulate a first flow rate of air in the first intake air path 215 and a second flow rate of air in the second intake air path 217 by controlling the positions of the first and second throttle valves 112, 114.

The positions of the first and second throttle valves 112, 114 may be set based on a function of engine coolant and intake air temperatures. For example only, the valve control signal Vctrl may be defined as provided in expression 2.

$$V_{ctrl}=F\{ECT,IAT\} \quad (2)$$

ECT is an engine coolant temperature. IAT is an intake air temperature. Although the engine coolant temperature and the intake air temperature are shown in expression 2, the valve control signal $V_{ctrl}$ may be a function of other engine temperatures, such as an engine oil temperature and a combustion chamber temperature.

In step 322, the valve actuation module 204 receives the valve control signal and generates first and second actuation signals based on the valve control signal. The first actuation signal may be used to actuate the first throttle valve 112. The second actuation signal may be used to actuate the second throttle valve 114. For example only, the first throttle valve 112 may be set in a fully closed position and the second throttle valve 114 may be set in a fully open position. This allows air to flow sequentially through the first air conduit 214, the heat exchanger 110, the second air conduit 216, and the second throttle valve 114. The intake air is drawn into the intake manifold 124 via the intake air paths 215, 217.

Additionally, the throttle valves 112, 114 may be opened and closed based on the valve position signals VP1, VP2 from the TPSs 116, 118. The throttle valves 112, 114 may be partially and/or gradually opened and closed to mix hot and cold air to provide predetermined or set temperature. The throttle valve control module 202 receives the valve position signals VP1, VP2 and generates the valve control signal based on the valve position signals VP1, VP2. The valve actuation module 204 receives the valve control signal and change valve positions for the throttle valves 112, 114 based on the valve control signal.

In step 324, the mode enablement module 206 disables the SI mode to allow the engine 102 to operate in the HCCI mode. In step 326, the mode enablement module 206 enables the HCCI mode based on the mode signal and the temperature signal. The HCCI mode may be enabled when the mode signal indicates the HCCI mode and the temperature signal is greater than or equal to the predetermined temperature.

In step 328, the valve actuation module 204 may regulate the first and second throttle valves 112, 114 to maintain the intake air to predetermined temperature and airflow rate for the enabled HCCI mode. The intake air may be drawn into the intake manifold 124 via the intake air paths 215, 217. Control may end at step 330.

The above-described steps are meant to be illustrative examples; the steps may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for an engine comprising:
a mode determination module that generates a mode signal based on an engine speed signal and an engine load signal,
wherein the mode signal indicates transitioning from a spark ignition (SI) mode to a homogeneous charge compression ignition (HCCI) mode;
an intake air control module generating a temperature signal based on at least one of a coolant temperature of the engine and an oil temperature of the engine,
a throttle valve control module that both transitions from the SI mode to the HCCI mode and generates a valve control signal based on the mode signal, the temperature signal, and a plurality of valve position signals that indicate positions of a first throttle valve and a second throttle valve,
wherein the throttle valve control module controls positions of:
the first throttle valve to regulate a first flow rate of intake air out of the first throttle valve and into an intake manifold of the engine based on the valve control signal; and
the second throttle valve to regulate a second flow rate of intake air through a heat exchanger and into the intake manifold based on the valve control signal; and
a valve actuation module that actuates the first throttle valve and the second throttle valve based on the valve control signal.

2. The system of claim 1, further comprising:
a first throttle position sensor that detects a position of the first throttle valve and generates a first valve position signal; and
a second throttle position sensor that detects a position of the second throttle valve and generates a second valve position signal,
wherein the plurality of valve position signals comprise the first valve position signal and the second valve position signal.

3. The system of claim 1, wherein the throttle valve control module directs the intake air out of the first throttle valve into the intake manifold via the valve actuation module and the first throttle valve when the temperature signal is less than a predetermined temperature, and
wherein the throttle valve control module directs the intake air from the heat exchanger into the intake manifold via the valve actuation module and the second throttle valve when the temperature signal is less than the predetermined temperature.

4. A method of controlling intake airflow of an engine, comprising:
generating a mode signal based on an engine speed signal and an engine load signal;

generating a temperature signal based on at least one of a coolant temperature of the engine and an oil temperature of the engine;

indicating transitioning from a spark ignition (SI) mode to a homogeneous charge compression ignition (HCCI) mode via the mode signal;

both transitioning from the SI mode to the HCCI mode and generating a valve control signal based on the mode signal, the temperature signal, and a plurality of valve position signals that indicate positions of a first throttle valve and a second throttle valve;

controlling positions of:
the first throttle valve to regulate a first flow rate of intake air out of the first throttle valve and into an intake manifold of the engine based on the valve control signal; and
the second throttle valve to regulate a second flow rate of intake air through a heat exchanger and into the intake manifold based on the valve control signal; and actuating the first throttle valve and the second throttle valve based on the valve control signal.

5. The method of claim 4, further comprising:
generating the engine speed signal via an engine speed sensor;
generating the engine load signal via a mass airflow sensor; and
generating the temperature signal based on at least one of an intake air temperature signal and a combustion chamber temperature signal.

6. The method of claim 4, further comprising:
detecting a position of the first throttle valve via a first throttle position sensor;
generating a first valve position signal based on the position of the first throttle valve;
detecting a position of the second throttle valve via a second throttle position sensor;
generating a second valve position signal based on the position of the second throttle valve; and
comprising the first valve position signal and the second valve position signal as the plurality of valve position signals.

7. The method of claim 4, further comprising:
transferring heat from an exhaust of the engine to the intake air flowing through the heat exchanger;
regulating the first throttle valve and the second throttle valve to maintain a predetermined temperature, the first flow rate, and the second flow rate; and
enabling the HCCI mode based on the mode signal and the temperature signal.

8. The system of claim 1, wherein the throttle valve control module both positions the first throttle valve in a closed position and the second throttle valve in an open position in response to the engine speed signal being in a first predetermined range, the engine load signal being in a second predetermined range and the temperature signal being less than a predetermined temperature.

9. The system of claim 8, wherein the throttle valve control module:
transitions from operating in the SI mode to operating in the HCCI mode in response to the temperature signal being greater than the predetermined temperature; and
regulates openings of the first throttle valve and the second throttle valve while operating in the HCCI mode.

10. The system of claim 9, wherein the throttle valve control module regulates openings of the first throttle valve and the second throttle valve based on the coolant temperature of the engine and an intake temperature of the engine.

11. The system of claim 9, wherein the throttle valve control module regulates openings of the first throttle valve and the second throttle valve based on the oil temperature of the engine and a combustion chamber temperature of the engine.

12. The system of claim 9, wherein the throttle valve control module operates in the SI mode in response to the engine being started and the temperature signal being less than the predetermined temperature.

13. The system of claim 8, wherein the throttle valve control module generates the engine load in response to a mass air flow signal.

14. The system of claim 8, wherein:
the intake air control module generates the temperature signal based on an engine coolant temperature signal, an intake air temperature signal, a combustion chamber temperature signal, and an engine oil temperature signal;
the engine coolant temperature signal is indicative of the coolant temperature of the engine; and
the engine oil temperature signal is indicative of the oil temperature of the engine.

15. The system of claim 1, wherein the throttle valve control module positions the first throttle valve in a fully closed position and the second throttle valve in a fully open position in response to the engine speed signal being in a first predetermined range, the engine load signal being in a second predetermined range and the temperature signal being less than a predetermined temperature.

16. The system of claim 1, wherein:
the throttle valve control module controls the positions of the first throttle valve and the second throttle valve based on an engine coolant temperature signal, an intake air temperature signal, a combustion chamber temperature signal, and an engine oil temperature signal;
the engine coolant temperature signal is indicative of the coolant temperature of the engine; and
the engine oil temperature signal is indicative of the oil temperature of the engine.

17. The system of claim 1, wherein the intake air control module generates the temperature signal based on the engine speed signal, the engine load signal and an engine torque.

18. The system of claim 1, wherein the throttle valve control module:
delays transitioning from the SI mode to the HCCI mode when the mode signal indicates enablement of the HCCI mode and the temperature signal is less than a predetermined temperature; and
transitions from the SI mode to the HCCI mode when the mode signal indicates enablement of the HCCI mode and the temperature signal is greater than or equal to the predetermined temperature.

19. A system for an engine comprising:
a mode determination module that generates a mode signal based on an engine speed signal and an engine load signal,
wherein the mode signal indicates transitioning from a spark ignition (SI) mode to a homogeneous charge compression ignition (HCCI) mode;
a throttle valve control module that both transitions from the SI mode to the HCCI mode and generates a valve control signal based on the mode signal, a temperature signal, and a plurality of valve position signals that indicate positions of a first throttle valve and a second throttle valve,
wherein the throttle valve control module controls positions of:

the first throttle valve to regulate a first flow rate of intake air out of the first throttle valve and into an intake manifold of the engine based on the valve control signal, wherein the first throttle valve receives intake air from an air filter via a first conduit; and the second throttle valve to regulate a second flow rate of intake air from the first conduit, through a heat exchanger and into the intake manifold based on the valve control signal, wherein the second throttle valve is connected downstream from the heat exchanger and receives intake air from a second conduit connected between the heat exchanger and the second throttle valve, wherein the second conduit is separate from the first conduit, and wherein the first throttle valve is connected upstream from the heat exchanger; and a valve actuation module that actuates the first throttle valve and the second throttle valve based on the valve control signal.

20. The system of claim 19, further comprising:

the first throttle valve connected between the first conduit and the intake manifold;

the second throttle valve connected between the second conduit and the intake manifold; and the heat exchanger connected between the first conduit and the second conduit.

* * * * *